US007919741B1

(12) United States Patent
Chiu et al.

(10) Patent No.: US 7,919,741 B1
(45) Date of Patent: Apr. 5, 2011

(54) INDIRECT WAVE FRONT SENSING

(75) Inventors: David K. Chiu, San Jose, CA (US);
Charles L. Yee, Cupertino, CA (US)

(73) Assignee: Lockheed Martin Corporation,
Bethesda, MD (US)

( * ) Notice: Subject to any disclaimer, the term of this patent is extended or adjusted under 35 U.S.C. 154(b) by 126 days.

(21) Appl. No.: 12/338,986

(22) Filed: Dec. 18, 2008

Related U.S. Application Data

(60) Provisional application No. 61/014,700, filed on Dec. 18, 2007.

(51) Int. Cl.
*G01J 1/20* (2006.01)
(52) U.S. Cl. ..................................... 250/201.9; 600/437
(58) Field of Classification Search ............... 250/201.9; 600/437
See application file for complete search history.

(56) References Cited

U.S. PATENT DOCUMENTS

| 6,485,423 | B2 * | 11/2002 | Angelsen et al. | ............. | 600/458 |
| 6,905,465 | B2 * | 6/2005 | Angelsen et al. | ............. | 600/437 |
| 7,273,455 | B2 * | 9/2007 | Angelsen et al. | ............. | 600/437 |

OTHER PUBLICATIONS

Um, G.S., B.F. Smithgall & C.L. O'Brien, "Minimum Variance Estimation of Wavefront Aberration" Proc. SPIE 351, 96-102 (1982).
W.H. Southwell, "Wave-front analyzer using a maximum likelihood algorithm," J. Opt. Soc. Am., vol. 67, No. 3, Mar. 1977, pp. 396-399.
M.R. Teague, "Irradiance moments: their propagation and use for unique retrieval of phase," JOSA 72, 1199-1209 (1982).

* cited by examiner

*Primary Examiner* — Seung C Sohn
(74) *Attorney, Agent, or Firm* — McDermott Will & Emery LLP

(57) ABSTRACT

Described are systems and methods that compensate for phase aberration in a high energy laser (HEL) without the need for a "beacon" laser or a wave front sensor to measure the phase aberration in the return signal from the "beacon" laser. In one aspect, the systems and methods use an imaging camera to image a HEL hit spot on a target, estimate the phase aberration of the HEL at the target based on the image of the HEL hit spot, and compensate for the phase aberration in the HEL using the estimated phase aberration. Also described are systems and methods that clean up an image of a target by estimating a wave aberration of an incoming beam based on the image of the target and clean up the image of the target using the estimated wave front aberration.

19 Claims, 11 Drawing Sheets

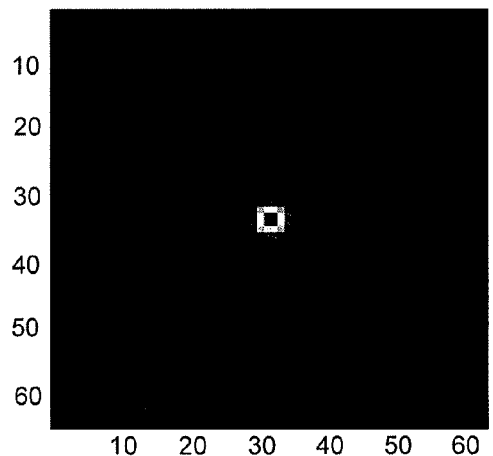
FIG. 13a — Known true object
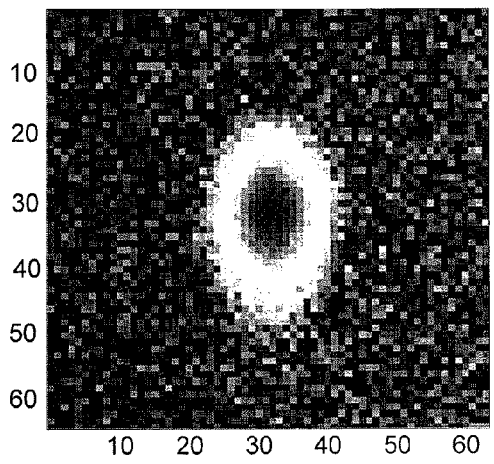
FIG. 13b — Measured image intensity
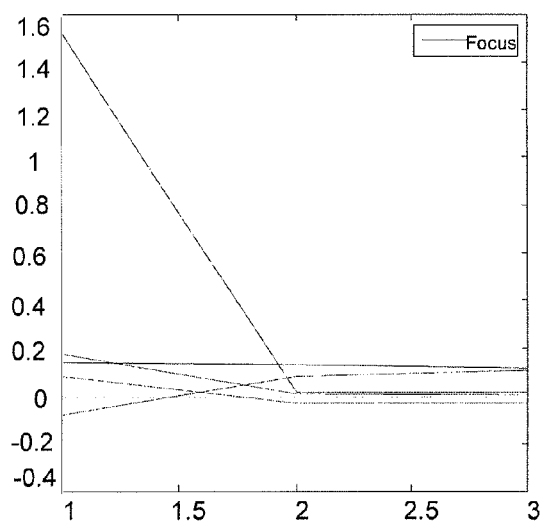
FIG. 13c — Aberration error vs. iteration
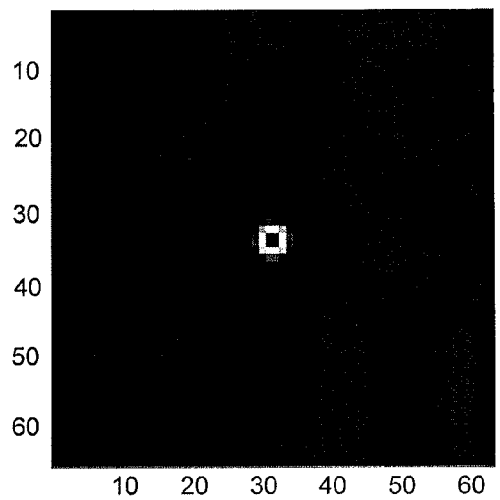
FIG. 13d — Corrected Image intensity

INDIRECT WAVE FRONT SENSING

RELATED APPLICATION

The present application claims the benefit of priority under 35 U.S.C. §119 from U.S. Provisional Patent Application Ser. No. 61/014,700, entitled "INDIRECT WAVE FRONT SENSING," filed on Dec. 18, 2007, which is hereby incorporated by reference in its entirety for all purposes.

FIELD OF THE INVENTION

The present invention generally relates to wave front sensing and, more particularly, to systems and methods for indirect wave front sensing.

BACKGROUND OF THE INVENTION

Tactical applications of high power laser weapon systems require compact and lightweight beam control systems (BCSs) that can be carried on a variety of tactical platforms. These platforms include ground vehicles, manned and unmanned aircrafts, helicopters, and naval ships. The BCS acquires the target from a battle manager, tracks (and possibly identifies) the target, and determines an aim point on the target either manually or automatically. The BCS further focuses, points, and maintains the high energy laser beam on the desired aim point until the target is destroyed. Current state-of-the-art BCSs include adaptive optics for compensating the phase aberrations of the high energy laser beam at the target. These adaptive optics systems typically include a "beacon" laser for creating a pseudo-star on the target and a wave front sensor for measuring the phase aberration of the return signal generated by the pseudo-star. The phase measurement from the return signal is then used to command a deformable mirror for correcting the phase aberrations at the target. The "beacon" laser and wave front sensor adds complexity, weight, volume, and cost to the BCS.

SUMMARY OF THE INVENTION

Described are systems and methods that compensate for phase aberration in a high energy laser (HEL) of a directed energy system without the need for a "beacon" laser or a wave front sensor to measure the phase aberration in the return signal from the "beacon" laser. In one aspect, the systems and methods image a HEL hit spot on a target with an imaging camera, estimate the phase aberration of the HEL at the target based on the image of the HEL hit spot, and compensate for the phase aberration in the HEL using the estimated phase aberration. By imaging the HEL hit spot on the target, the systems and methods eliminate the need for a separate "beacon" laser, and replace the wave front sensor used to measure the phase aberration in the return signal from the "beacon" laser with an imaging camera, which is lower in cost and more compact. Thus, the systems and methods described herein reduce the complexity, weight, volume, and cost of a directed energy system.

Also described are systems and methods that clean up an image of a target. In one aspect, the systems and methods image a target, estimate a wave aberration of an incoming beam from the target based on the image of the target, and clean up the image of the target using the estimated wave front aberration. The cleaned up image may be used for tracking and/or identifying the target.

In one aspect, an optical system comprises an imaging system configured to image a hit spot of a high energy laser (HEL) on a target and a phase compensator configured to apply a phase compensation to the HEL. The optical system further comprises a processor configured to receive an image of the hit spot on the target from the imaging system, estimate a phase aberration based on the image of the hit spot, and adjust the phase compensator based on the estimated phase aberration to compensate for the phase aberration in the HEL.

In another aspect, an optical system comprises an imaging system configured to image a target and a processor. The processor is configured to receive an image of the target from the imaging system, estimate a wave front aberration based on the image of the target, and clean up the image of the target based on the estimated wave front aberration. The cleaned up image of the target may be used to track and/or identify the target.

Additional features and advantages of the invention will be set forth in the description below, and in part will be apparent from the description, or may be learned by practice of the invention. The advantages of the invention will be realized and attained by the structure particularly pointed out in the written description and claims hereof as well as the appended drawings.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate aspects of the invention and together with the description serve to explain the principles of the invention.

FIGS. 13a-13d show simulation results for coherent image cleanup according to an aspect of the present disclosure.

DETAILED DESCRIPTION OF THE INVENTION

Figure 1:
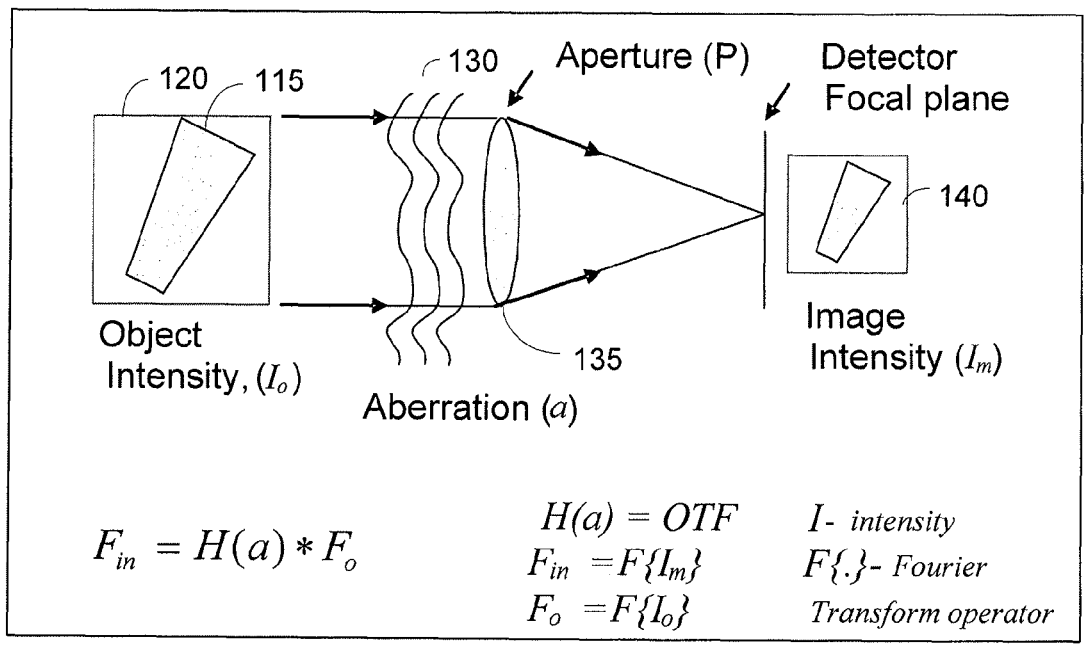
FIG. 1 is a diagram illustrating an example of an incoherent imaging system.

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail to avoid obscuring concepts of the present invention.

Reference will now be made in detail to aspects of the subject technology, examples of which are illustrated in the accompanying drawings, wherein like reference numerals refer to like elements throughout.

FIG. 1 illustrates an incoherent optical imaging system, in which a target 115 is incoherently illuminated. In FIG. 1, a light beam from the target travels through an atmosphere, which introduces a wave front aberration a 130 in the beam. The beam then passes through an aperture 135 of the imaging optical system to an optical detector, e.g., camera, which measures an image intensity $I_m$, 140 of the target. As shown in FIG. 1, the relationship between the target intensity $I_o$ 120 and the image intensity $I_m$ 140 may be expressed as:

$$F_{in} = H(a) * F_o \quad (1)$$

where $H(a)$ is an optical transfer function of the optical system, and $F_{in}$ and $F_o$ are the Fourier transforms of the image intensity $I_m$ and the target intensity $I_o$, respectively.

The image intensity $I_m$ is a function of the target intensity $I_o$ and the wave front aberration a, which may be expressed as:

$$\vec{I}_m = f(\vec{a}, \vec{I}_o) \quad (2)$$

where $\vec{I}_m$ and $\vec{I}_o$ are the discretized and vectorized intensity fields of the measured image and the unaberrated target image, respectively. In Eq. (2), the aberration a is expressed as a vector a, which may comprise coefficients for different aberrations modes, e.g., Zernike modes, that are present in the aberration. The intensity and aberration have the following dimensions:

$$a \in R^n, I \in R^m$$

where dimension n may be a number of Zernike modes and dimension m may be a number of pixels in the image. The Zernike modes may include focus, coma, astigmatism modes and/or other modes. The phase retrieval and image cleanup problem is as follows: given $\vec{I}_m$, search for $\vec{a}$ and $\vec{I}$.

In the present disclosure, it is to be understood that the image intensity $I_m$, target intensity $I_o$ and aberration a can be represented as vectors, as explained above.

One approach to searching for the aberration a starts from Eq. (2). In Eq. (2), the function f for the image intensity is a non-linear function of two variables. Suppose, for now, that the target intensity $I_n$ is known and is equal to $\hat{I}_0$. The function f can be expanded about â in a Taylor series as follows:

$$I_m(a, \hat{I}_o) = \hat{I}_m(\hat{a}, \hat{I}_o) + \nabla(\hat{a}, \hat{I}_o)\hat{a} + o(\hat{a}^2, \hat{I}_o) + n \approx \hat{I}_m(\hat{a}, \hat{I}_o) + \nabla \hat{a} \quad (3)$$

where $\nabla$ is a gradient given by $$\nabla = \left. \frac{\partial f}{\partial \vec{a}} \right|_{\hat{a}, \hat{I}_o},$$

n is measurement noise and o( ) are higher order terms. The approximation on the right side of Eq. (3) is obtained by retaining only the first order term of the Taylor series.

An error cost function e(a) may be represented by the L-2 norm of the image intensity error as follows:

$$e = \text{norm}(I_m - \hat{I}_m) \quad (4)$$

The aberration a for the image intensity can be estimated by finding â corresponding to a global minimum of the error cost. The cost function may be computed, for example, by squaring the differences between corresponding pixels of $I_m$ and $\hat{I}_m$, and summing the squares of the differences.

A search algorithm can be used to find â that minimizes the error cost starting from an initial estimate for â. For example, a steepest-descent type of search algorithm that converges to a solution in finite time can be used to find â that minimizes the error cost as follows:

$$\hat{a}_{k+1} = \hat{a}_k + (\nabla_k^T \nabla_k)^{-1} \nabla_k^T (I_m - \hat{I}_m) \quad (5)$$

where k is an iteration index for the search and $\nabla_k$ is the gradient at $\hat{a}_k$. Note that minimizing the error cost function is equivalent to maximizing the likelihood function of the intensity measurement with zero mean Gaussian random noise according to W. H. Southwell, "Wave-Front Analyzer Using A Maximum Likelihood Algorithm," J. Opt. Soc. Am., Vol. 67, No. 3, March 1977, pp. 396-399.

For large aberrations a, the surface of the error cost function e(a) of Eq. (4) becomes less and less predictable with local minima everywhere. As a result, it is difficult, if not impossible, to converge to a solution that minimizes the error cost e if the initial guess is far away from the global minimum. This situation is like searching for a small well in a vast desert plain. Despite this problem, a solution has been found using the theorem set forth below.

Theorem 1: When the aberrations are small and a focus bias is presence in the wave-front, the algorithm in Eq. (5) will converge to the global minimum of Eq. (4) from the initial guess zero when the focus estimate is close to the actual focus.

Figure 2:
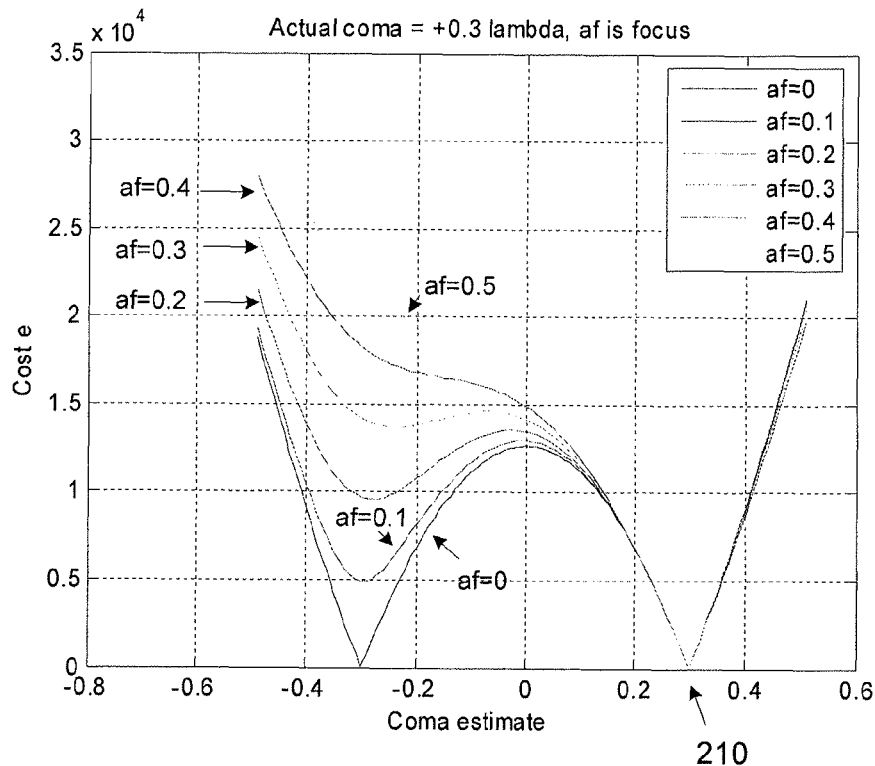
FIG. 2 is a plot of error cost function curves at different focus biases according to an aspect of the present disclosure.

A proof of this theory is given in U.S. Provisional Patent Application Ser. No. 61/014,700, which was previously incorporated by reference. The general idea of the proof may be illustrated with reference to FIG. 2, which shows several curves of the error cost function with two Zernike modes for defocus and coma for different focus biases. As shown in FIG. 2, the error cost function is a convex function if focus bias is present and the gradient of the error cost function at $a_{coma}=0$ always points toward the global minimum 210, where $a_{coma}$ is a coma mode of the aberration. Because the gradient of the error cost function at $a_{coma}=0$ points toward the global minimum 210, the steepest-descent search algorithm in Eq. (5) converges to the global minimum 210 of the error cost function (0.3λ in this example) from an initial guess of $a_{coma}=0$. This result can be extended to multi-mode situations.

Figure 3:
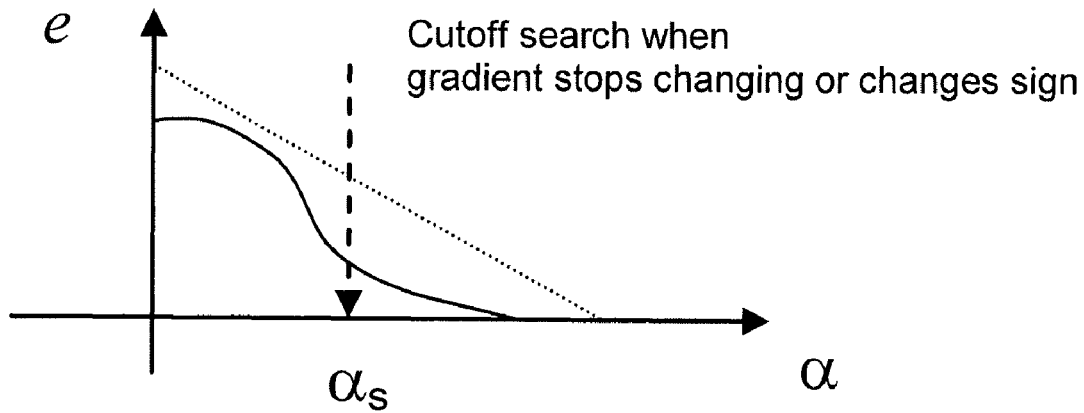
FIG. 3 is a plot of an initial line search according to an aspect of the present disclosure.

An initial line search may be used to speed up the search process by using Eq. (5) as follows:

$$\hat{a}_1 = \hat{a}_0 + (\nabla_0^T \nabla_0)^{-1} \nabla_0^T (I_m - \hat{I}_m) \alpha_s \quad (6)$$

where $\alpha_s$ is a running parameter and $\nabla_0$ is the gradient at $\hat{a}_0$. The running parameter $\alpha_s$ is increased until the change of the gradient of the error cost function becomes zero or changes sign. The initial line search is conducted in a direction of the sign of a focus error. FIG. 3 shows an example of this in which the line search stops when the change in the gradient of the error cost function changes sign. At this point, the search algorithm in Eq. (5) may be used starting from $â_1$. In this way, the estimate of the aberration a will be close enough to the solution to guarantee a fast convergence to the real solution. A similar result can be shown for the coherent imaging case. The initial line search is optional.

Methods for estimating initially large amplitude aberrations will now be described.

In many cases, large amplitude aberrations are usually in the low spatial frequency such as focus, coma and astigmatism which are caused by optical misalignment and change relatively slowly in time with respect to other higher order modes. If one can estimate these large amplitude spatial aberrations relatively accurately initially, one can make use of Theorem 1 to assure convergence to the real solution and subsequently track the wave-front as it changes in time. The line search discussed above is an approach for estimating these large initial aberrations. Another approach is through intensity moments. One way to estimate the focus aberration is by measuring the sharpness of the image using Eq. (7) as the focus f is changed by a focus mirror or lens:

$$e_f(f, a_f) = \left( \frac{\int_P I_m^2 dA}{\int dA} \right) \quad (7)$$

where $e_f$ will be maximized when the focus aberration $a_f$ is eliminated. The position of the focus mirror or lens where $e_f$ is maximized may be referred to as the zero focus position. In addition to this measurement, two more measurements can be used to estimate two modes of coma (x-coma and xy-coma) while changing the focus f. The two measurements for the two modes of coma are as follows:

$$e_x(f, a_{cx}) = \left( \frac{\int_P I_m \times (x - x_c)^2 dA}{\int_P dA} \right) \quad (8)$$

$$e_{xy}(f, a_{cxy}) = \left( \frac{\int_P I_m \times [w \cdot v]^2 dx}{\int_P dA} \right) \quad (9)$$

where $$x_c = \frac{\int_P I_m x dA}{\int_P dA} \text{ and } y_c = \frac{\int_P I_m y dA}{\int_P dA} \text{ are the centroids}$$

$$w = [(x - x_c) \; (y - y_c)]$$

$$v = \frac{1}{\sqrt{2}} \begin{bmatrix} 1 \\ 1 \end{bmatrix}$$

The estimates of focus, x-coma, and xy-coma aberrations are as follows $$â_f = e_f^{-1}[\max_f(e_f(f, a_f))] \quad (10)$$

$$â_x = e_x^{-1}[\max_f(e_x(f, a_x))] \quad (11)$$

$$â_{xy} = e_{xy}^{-1}[\max_f(e_{xy}(f, a_{xy}))] \quad (12)$$

Figure 4:
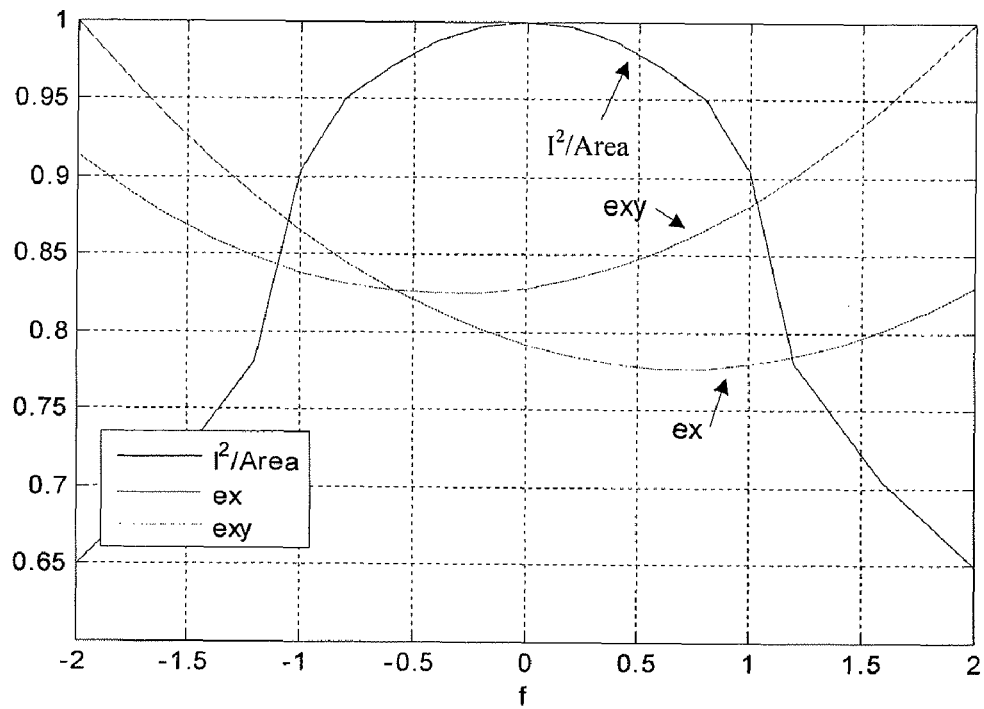
FIG. 4 is a plot of performance indices related to focus and coma (e.g., sharpness index for focus) versus focus according to an aspect of the present disclosure.

An advantage of using these three measurements is that all three measurements are independent of one another and are invariant with respect to image position and rotation. FIG. 4 shows an example of the normalized value of each measurement using 20 image frames as the focus is varied. The wave front consists of 3 Zernike modes of focus and 2 comas. The rms of the x-coma and xy-coma are 0.62λ and −0.3λ, respectively. The $e_f$ measurement peaks at zero which is expected. The other two measurements have minimums occurring around their corresponding values. One can obtain initial coarse estimates of the comas from the curves. Additional measures can be used to estimate the other low-order Zernike modes using an approach similar to one described in M. R. Teague, "Irradiance Moments: Their Propagation And Use For Unique Retrieval Of Phase," JOSA 72, 1199-1209 (1982).

The intensity moments approach described above may be used to estimate and remove an initially large aberration from the image intensity $I_m$, leaving a smaller residual aberration. This step is optional and may be omitted, for example, if the amplitude of the initial aberration is small enough for the search in Eq. (5) to converge to the global minimum of the error cost function.

Figure 5:
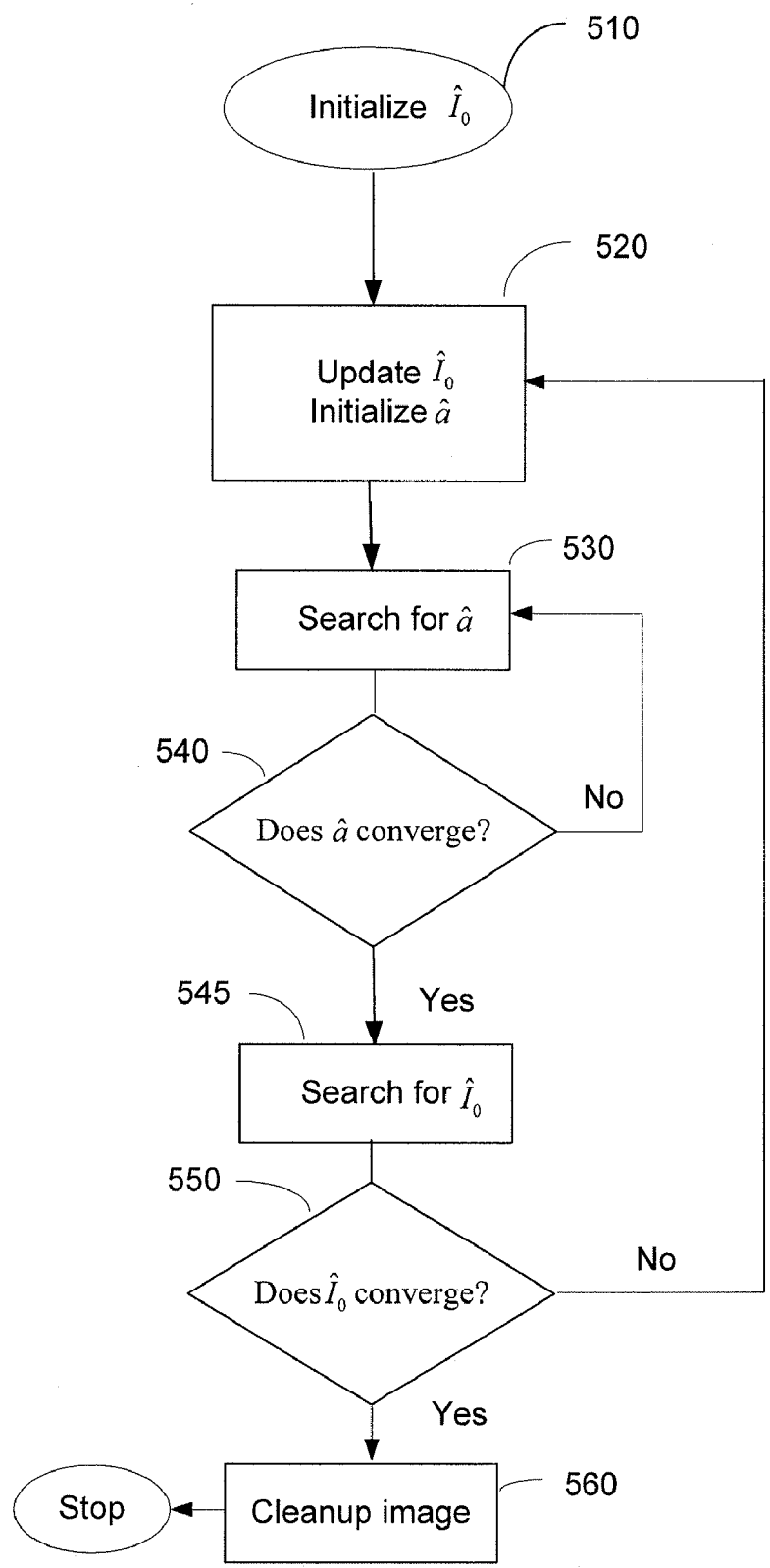
FIG. 5 is a flowchart of a process for indirect wave front sensing and image clean up according to an aspect of the present disclosure.

FIG. 5 is a flowchart of a process for indirect wave front sensing (IWS) and image cleanup according to an aspect of the present disclosure.

In operation 510, the process obtains an initial estimate of the target intensity $Î_0$. This may be done by finding the zero focus point, imaging the target at the zero focus point, and using the measured image at the zero focus point for the initial target intensity $Î_0$. As discussed above, the zero focus point may be found by moving a focus mirror or lens until the image sharpness is maximized according to Eq. (7).

In operation 520, the process introduces a known focus bias in the imaging system, e.g., by moving the focus mirror or lens from the zero focus point to a focus bias point. The process then initializes the aberration estimate $â_0$ at a focus aberration corresponding to the focus bias with the other aberration modes set to zero. The process also measures the image intensity $I_m$ with the focus bias and uses this image intensity $I_m$ to search for â that minimizes the error cost in operation 530, as discussed below.

In operation 530, the process searches for the â that converges to the global minimum of the error cost function starting from the initial estimate in operation 520. The process may conduct the search using the search algorithm in Eq. (5), in which the target intensity is assumed to be constant and equal to $Î_0$ from operation 510. As discussed above, the presence of the focus bias facilitates convergence of a steepest-decent search algorithm to the global minimum of the error cost function resulting in a solution for the aberration a.

In operation 540, the process determines whether a has converged to the global minimum of the error cost function. If not, then the process continues the search in operation 530. If the aberration in the search converges, then the process proceeds to operation 550.

In operation 545, the process searches for a target intensity $Î_0$ that minimizes the error cost function with the aberration held constant at the aberration â determined from the search in operation 530. An exemplary method for searching for a target intensity $Î_0$ is described below.

The process then determines whether the target intensity $Î_0$ resulting from the search converges. Convergence of $Î_0$ may occur when $Î_0$ stops changing between consecutive searches. If the target intensity does not converge in operation 550, then the process proceeds to operation 520 where the estimate of the target intensity $Î_0$ is updated with the target intensity obtained from the search in operation 545. The process then proceeds to operation 530 where the process searches for a that minimizes the error cost with the target intensity held constant at the updated target intensity $Î_0$.

If the target intensity converges in operation 560, then the process proceeds to operation 560. In operation 560, the process cleans up the measured image intensity $I_n$, using the aberration determined in operation 530 to obtain a precise estimate of the target intensity $I_0$. In one aspect, the process does this by computing the inverse Fourier Transform of $F_{in}/H(a)$, where $F_{in}$ is the Fourier Transform of the measured image intensity and $H(a)$ is the optical transfer function (OFT) evaluated at the aberration determined from the search in operation 530.

The process in FIG. 5 provides indirect wave front sensing (IWS) by estimating the aberration a from a measured image. The process estimates the aberration a by searching for â and $\hat{I}_0$ that minimize the error cost. In the example in FIG. 5, the process searches for a in an inner loop comprising operations 530 and 540, in which $\hat{I}_0$ is held constant at an estimate of $I_0$ (e.g., initialized or updated $\hat{I}_0$). The process searches for $\hat{I}_0$ in an outer loop comprising operations 545, 550 and 530, in which â is held constant at the â determined in the inner loop. The inner and outer loop searches are performed until both â and $\hat{I}_0$ converge.

In the process in FIG. 5, an initial line search for â may be performed in operation 530, for example, when the focus bias is not known or when there is not enough time to determine the zero focus point and introduce the focus bias. In this aspect, the process may determine the sign of the focus error and conduct an initial line search for â in the direction of the sign of the focus error until the change in the gradient of the error cost function becomes zero or changes sign. Examples of systems for determining the sign of the focus error are described below with reference to FIGS. 10a and 10b.

An example of a search method for finding a target intensity $\hat{I}_0$ that minimizes the error cost function is described below according to an aspect of the present disclosure. To speed up the search for target intensity, a high contrast case is considered in which the target is almost uniformly illuminated compared to the background. In this case, the search space of the target intensity $\hat{I}_0$ reduces from a real space of dimension m to a binary space of dimension m.

$$I_o \epsilon R^m \rightarrow I_o \epsilon B^m \qquad (13)$$

where $B \epsilon \{0, \bar{I}\}$ and $\bar{I}$ is a positive real number. The search for the target intensity $\hat{I}_0$ that minimizes the error cost in Eq. (4) may be then be performed assuming the aberration â is constant. The search space reduces substantially by changing to binary space in Eq. (13). However, the search pace can be further reduced by establishing a reduced spatial search space as follows:

$$\hat{I}_o = c[\hat{I}_{o1}\ \hat{I}_{o2}\ \hat{I}_{o3}\ \ldots\ \hat{I}_{op}] \qquad (14)$$

$$\text{where } \hat{I}_{ok} = 1 \text{ or } 0,\ p < m, \text{ and } c = \frac{\sum I_m}{\sum \hat{I}_m}$$

Figure 6:
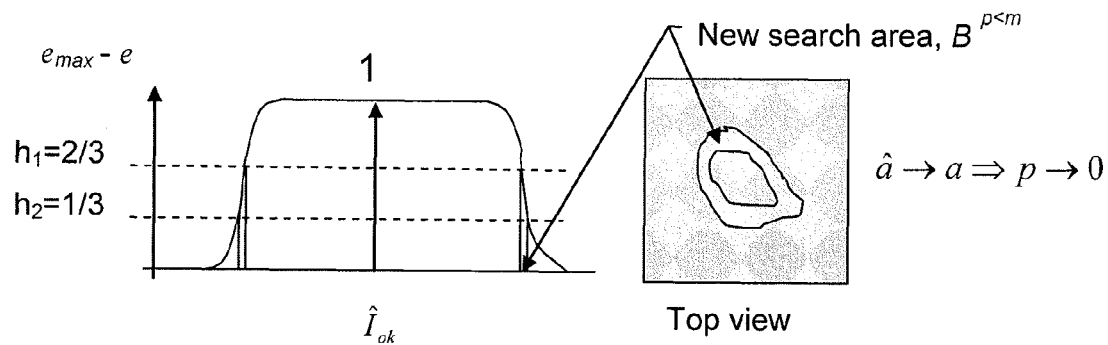
FIG. 6 is a diagram illustrating a reduced spatial search space according to an aspect of the present disclosure.

In Eq. (14), c scales $[\hat{I}_{o1}\ \hat{I}_{o2}\ \hat{I}_{o3}\ \ldots\ \hat{I}_{op}]$ so that the total power of the image field resulting from $\hat{I}_o$ equals the total power of the corresponding measured image. The reduced search space comes from the curve of the cost function e versus $\hat{I}_{ok}$ as shown in FIG. 6.

Figure 7:
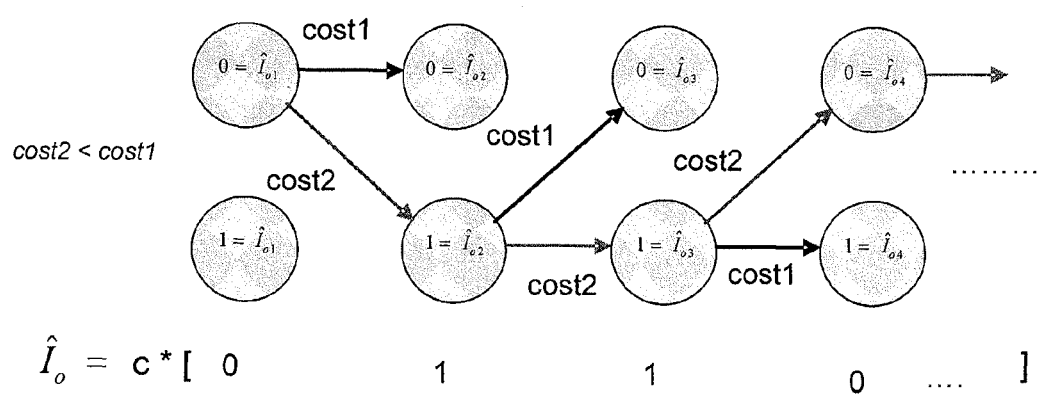
FIG. 7 is a diagram illustrating a search algorithm for target image intensity according to an aspect of the present disclosure.

The image field $\hat{I}_m$, for each point $\hat{I}_{ok}$ can be generated and stored a priori. Therefore, we only need to do subtractions to generate cost e for the map in FIG. 6 without having to perform a Fourier Transform. Finally, the search algorithm for the target intensity $\hat{I}_0$ in the reduced binary space can be done by a pseudo-dynamic program (order of the node sequence is random) as shown in FIG. 7. In FIG. 7, the search begins at $\hat{I}_{o1}=0$ and determines which value for $\hat{I}_{o2}$ results in lower cost. In the example in FIG. 7, a value of one for $\hat{I}_{o2}$ (i.e., $\hat{I}_{o2}=1$) results in lowest cost and is therefore chosen for $\hat{I}_{o2}$. From $\hat{I}_{o2}=1$, the search then determined which value for $\hat{I}_{o3}$ results in lower cost and so forth up to $\hat{I}_{op}$.

Once the optical transfer function OFT H(a) is determined at the aberration estimate from the IWS, there are various techniques for recovering the target image such as Wiener filter, Kalman filter, singular value decomposition (SVD) pseudoinverse, and many others approaches in the presence of noise. One approach that speeds up the computational process is described below.

Once the OTF H(a) is determined, the target image $I_0$ can be determined by performing an inverse Fourier Transform of $F_{in}/H(a)$ as shown in FIG. 1. Due to noise and higher order aberrations that are present in $F_{in}$, the measured image $I_m$ is passed through a spatial filter before performing the Fourier Transform and division. The spatial filter may be a windowed 2D linear-phase FIR digital filter. In addition, a small positive constant is added to H(a) as well. There are two reasons for doing this. First, in case H(a) contains any value close to zero, which is likely in the high frequency areas, the division will create problems. Secondly, a constant in H(a) represents impulses in the inverse FFT domain, which, to a certain degree, cancels out the noise in the image. From simulation results, a constant equal to three times the noise sigma was found to be an optimal level.

The methods and systems discussed above for cleaning up an incoherent image can also be applied to coherent imaging. In this case, a coherent HEL can be focused onto a target. A major difference aside from the coherent aspect of the HEL is that the intensity profile $I_o$ on the target is now known. As an example, it is desirable to maintain an Airy disk profile on the target to maximize the average energy in a circular bucket around a selected aim point. The intensity profile is considered known even if the profile is clipped by a finite target size. This is because the desired profile can still be estimated (though not as accurately) given estimates of the target width and length. Knowing $I_o$ greatly simplifies the calculation, but additional effects must be considered for the coherent imaging case.

The risks in using the IWS approach for adaptive optics (AO) using a coherent continuous wave (cw) HEL are similar to those of the incoherent imaging case: robustness to large initial aberrations, algorithm convergence, image noise, non-uniform target illumination, and computational throughput. The approach for handling these risk items for the coherent imaging case is similar to that of the incoherent imaging case. Although, the computational throughput requirements are less, the effects that are unique to the coherent imaging case include speckle, HEL backscattering, and target effects (non-uniform reflectivity and distorted surface feature due to HEL heating, target radius effects, etc).

Speckle can be reduced by a variety of mechanisms. Frequency diversity is one method to reduce speckle where a HEL source with coherence length $l_c = \lambda^2/\Delta\lambda$ is less than the radius R of the target where $\Delta\lambda$ is the bandwidth of the laser. Temporal diversity reduces speckle when the camera integration time $\tau_{int}$ satisfies the condition $\tau_{int} \gg l_c/c$ where c is the speed of light. The Signal-to-Noise ratio (SNR) equals $(\Delta\lambda R/\lambda^2)^{1/2}(\tau_{int}\ c/l_c)^{1/2} > 200$ for $\Delta\lambda > 0.3$ nm (or $\Delta\nu > 100$ GHz), R=30 mm, and $\tau_{int}$=100 ns. Current single mode 1.5 KW cw fiber lasers from IPG have a bandwidth $\Delta\lambda > 1$ nm with an excellent beam quality of $M^2 \leq 1.1@\sim 1.07$ um. Combining 1.5 KW fiber lasers into an array can potentially create power levels above 100 KW. The combined beam can be used as a HEL source for the indirect wave front sensing (IWS).

In one aspect, the IWS is performed by imaging the HEL hit spot. For a cw HEL, backscattering from the HEL could be a large source of background. However, by having different transmitting and receiving apertures for the HEL and a narrow field-of-view for a HEL hit spot camera, the HEL backscattering is not expected to be a problem.

Target effects are physical processes which affect the hit spot image that is independent of optical propagation effects, e.g., atmospheric turbulence, aero-optical boundary layer, HEL induced heating of the optics, etc. Target effects include physical deformation of the target surface or non-uniform reflectivity of the target upon heating or melting. This is a concern only if target effects cause the corrected wave front to reduce the encircled energy in the desired spot.

Figure 8:
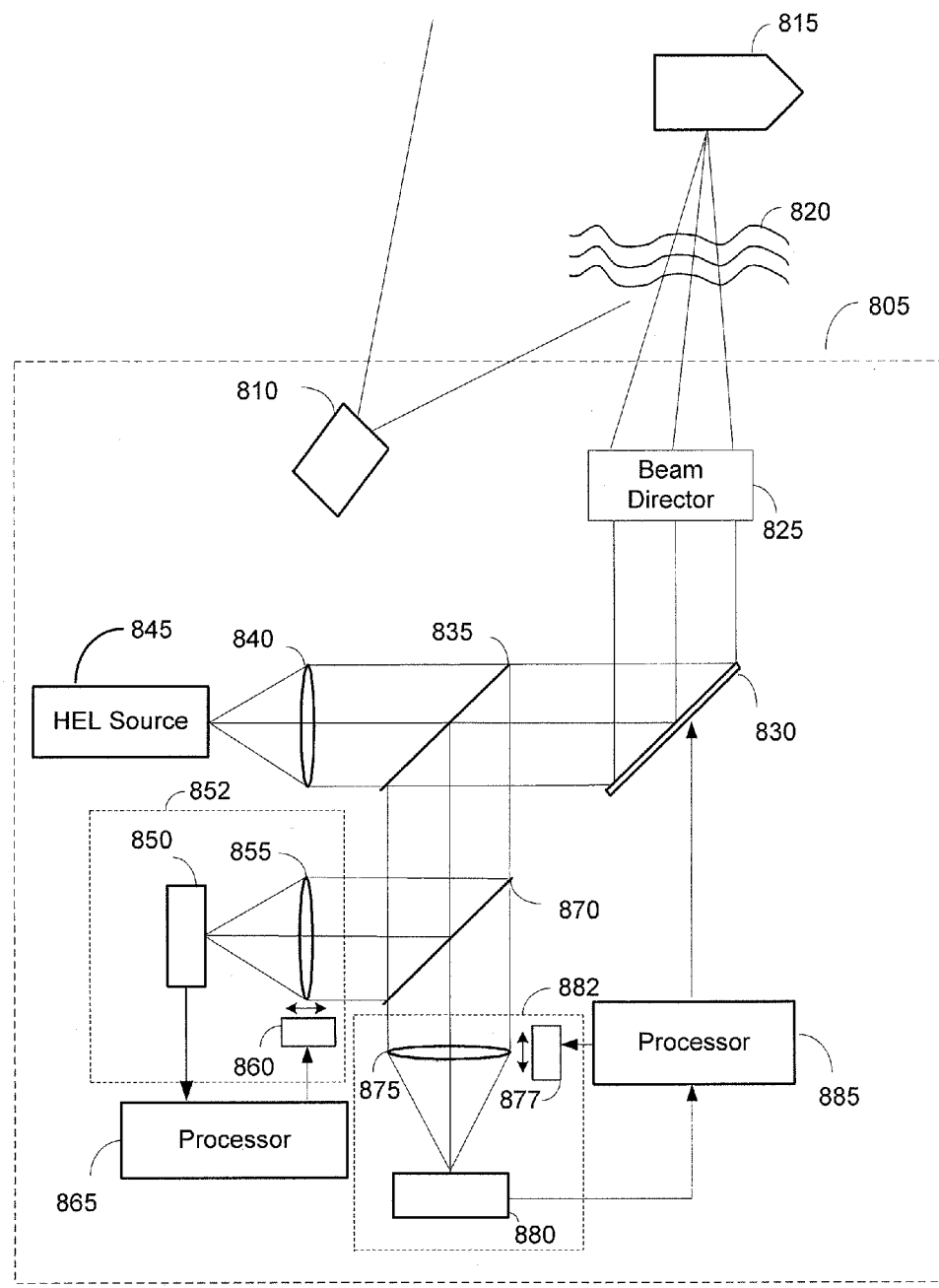
FIG. 8 is a block diagram of a system according to an aspect of the present disclosure.

FIG. 8 is a block diagram of a system 805 according to aspects of the present disclosure. In one aspect, the system 805 tracks and identifies a target by illuminating the target 815, imaging the illuminated target 815, and performing IWS and cleanup of the target image, for example, using the process in FIG. 5. In this aspect, the system 805 comprises an illuminator 810, a beam director 825, a deformable mirror 830, a first beam splitter 835, a second beam splitter 870, a target imaging system 852, and a first processor 865.

The target imaging system 852 is used to image the target 815 with an adjustable focus. The target imaging system 852 comprises a first lens 855, a first lens actuator 860, and a target camera 850. In one aspect, the focus of the target imaging system 852 is adjusted by having the first lens actuator 860 controllably move the first focus lens 855 on a stage to different focal positions. Alternatively, the focus may be adjusted by controllably moving the target camera 850 or other mechanism.

During operation, the illuminator 810 illuminates the target 815, e.g., with a high-powered incoherent beam. A beam reflected from the target 815 passes through the atmosphere 820, which introduces a wave front aberration in the beam. The beam then enters the system 805 through the beam director 825 and is directed to the target camera 850 by the deformable mirror 830, the first and second beam splitters 835 and 870, and the first focus lens 855. The beam director 825 may include a fast steering mirror (not shown) for controllably steering the light beam from the target 815 to the deformable mirror 825 while the target 815 is moving, and may be mounted in a turret. As explained further below, the first and second beams splitters 835 and 870 allows the light beam 840 to share an optical path with a HEL.

The target camera 850 obtains images of the target 815, which are feed to the first processor 865. In one aspect, the first processor 865 performs IWS and image cleanup, for example, based on the process in FIG. 5.

Figure 9A:
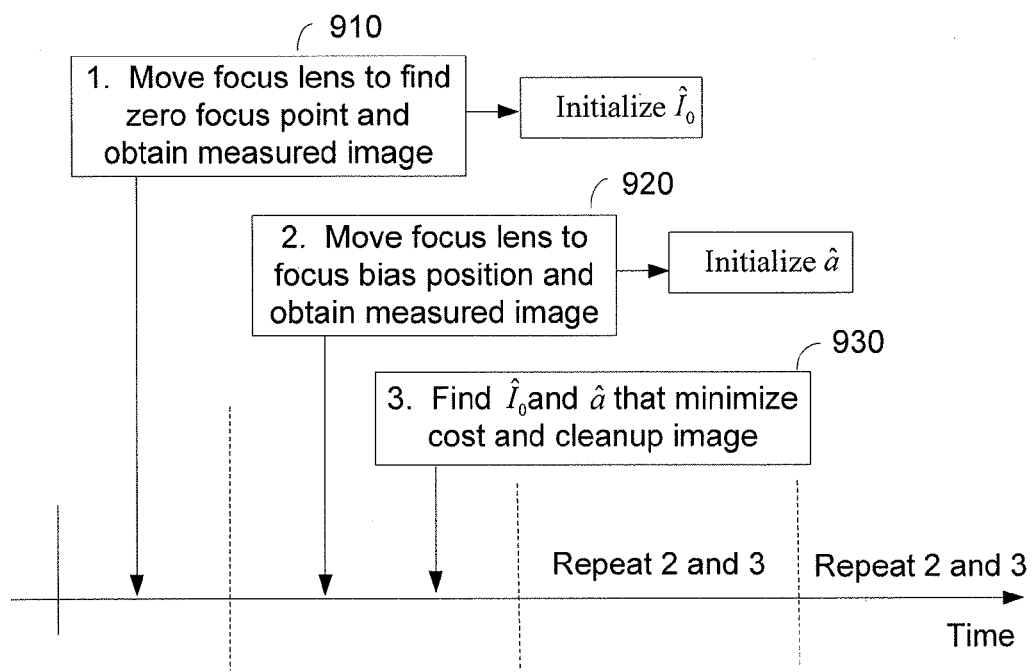
FIG. 9a is a timeline illustrating operations for indirect wave front sensing and image clean up according to an aspect of the present disclosure.

FIG. 9a shows an exemplary timeline of the operations that may be performed by the first processor to perform IWS and image cleanup. In a first operation 910, the first processor 865 moves the first focus lens to find the zero focus point. The first processor 865 may do this, for example, by sending commands to the first lens actuator 860 to move the first focus lens 855 to different focal positions until the image sharpness is maximized according to Eq. (7). The first processor 865 may then obtain a measured image at the zero focus point and initialize $\hat{I}_0$ using this measured image.

In a second operation 920, the first processor 865 moves the first focus lens 855 to a focus bias position to introduce a known focus bias and obtains a measured image at the focus bias position. The first processor 865 may then initialize $\hat{a}$ at the focus bias.

In a third operation 930, the first processor 865 performs a search for $\hat{a}$ and $\hat{I}_0$ that minimize the error cost, for example, according to Eqs. (4) and (5). After determining the estimate of the aberration a from the search, the first processor 865 can then clean up the measured image by computing the inverse Fourier Transform of $F_{in}/H(a)$. The second and first operations may be performed within a few to tens of milliseconds for real-time IWS and image cleanup.

To perform IWS and image cleanup for subsequent time frames, the first processor 865 may repeat the second and third operations. In one aspect, for a subsequent time frame, the first processor 865 uses the target intensity from the previous time frame for $\hat{I}_0$ and uses the focus bias position from the previous time frame to initialize $\hat{a}$. In this aspect, the first processor 865 may search for $\hat{a}$ that minimizes the error cost at the $\hat{I}_0$ from the previous frame. After determining the estimate of the aberration a from the search, the first processor 865 can clean up the measured image using the estimated aberration. In this example, it is assumed that the target image changes little between consecutive time frames, and, thus, the target intensity $\hat{I}_0$ from the previous time frame provides a close approximation of the target intensity in the subsequent time frame. For large changes in the target image, the first processor 865 can repeat the first operation 910 to reacquire the zero focus point and obtain a new focus bias.

After the image of the target is cleaned up, the first processor 865 can use the cleaned up image to track the target 815. For example, the first processor 865 can send commands to the beam director 825 to direct a HEL at a desired aim point on the target 815. The first processor 825 may also use the cleaned up image to identify the target, for example, by feeding the cleaned up image into a classifier.

In another aspect, the system 815 also directs a high energy laser (HEL) to the target 815, computes a phase aberration of the HEL on the target, and corrects for the phase aberration. In this aspect, the system 805 comprises a HEL source 845, a lens 840, the first and second beam splitters 835 and 870, the deformable mirror 830, the beam director 825, a HEL imaging system 882, and a second processor 885. The HEL imaging system 882 is used to image a hit spot of the HEL on the target 815 with an adjustable focus. The HEL imaging system 882 comprises a second lens 875, a second lens actuator 877 for controllably moving the first focus lens 855, and a HEL camera 880.

During operation, the HEL source 845 emits a HEL. The lens 840, first beam splitter 835, deformable mirror 830 and beam director 825 direct the HEL to the target 815. A beam from the HEL hit spot on the target 815 passes through the atmosphere and enters the system 805 through the beam director 825. The beam from the hit spot is then directed to the HEL camera 880 by the deformable mirror 830, the first and second beam splitters 835 and 870, and the second focus lens 875. The HEL camera 880 obtains images of the hit spot on the target 815, which are feed to the second processor 885. In one aspect, the second processor 885 performs IWS on an image of the hit spot to determine the phase aberration of the HEL and corrects the phase aberration, for example, by adjusting the deformable mirror 830.

Figure 9B:
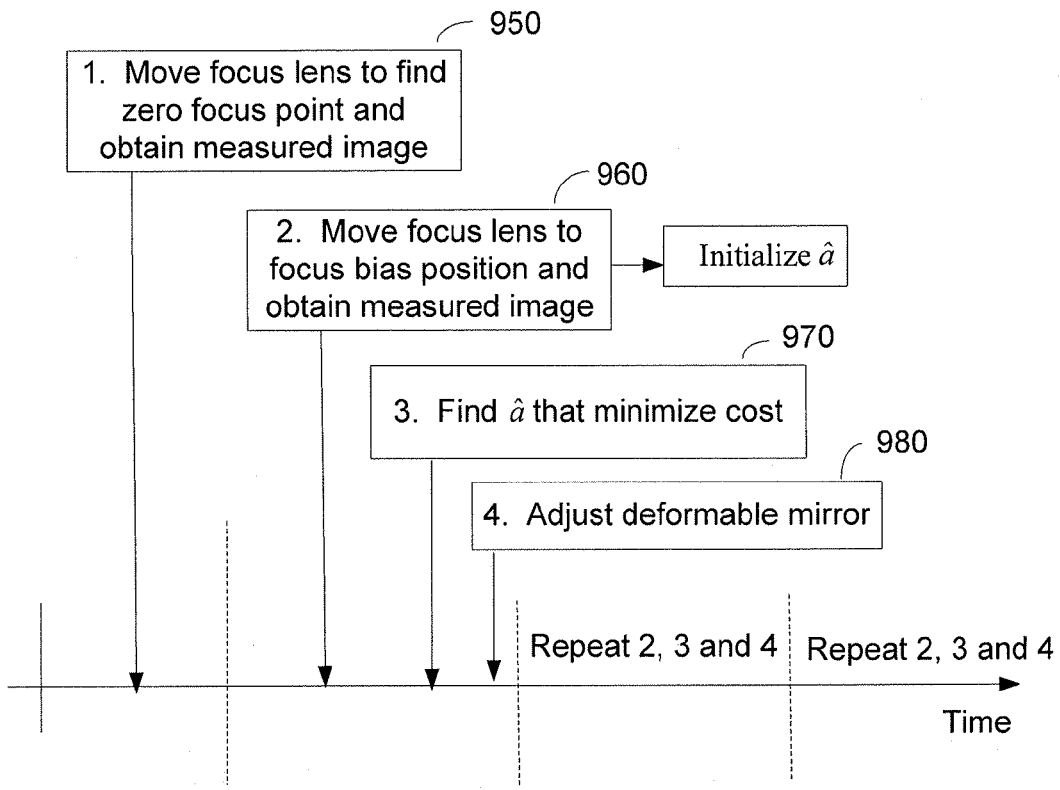
FIG. 9b is a time line illustrating operations for compensating phase aberrations in a high energy laser according to an aspect of the present disclosure.

FIG. 9b shows an exemplary timeline of the operations that may be performed by the second computer to perform IWS and phase correction for the HEL. In a first operation 950, the second processor 880 moves the second focus lens to find the zero focus point. The second processor may do this, for example, by sending commands to the second lens actuator 890 to move the second focus lens 875 to different focal positions until the image sharpness is maximized according to Eq. (7).

In a second operation 960, the second processor 880 moves the second focus lens 880 to a focus bias position to introduce a known focus bias and obtains a image of the HEL hit spot at the focus bias position. The first processor 880 may then initialize â at the focus bias. Alternatively, the processor computer 880 may move the second focus lens 875 to the focus bias position used for the target image, thereby eliminating the need for the first operation 950. This may be done, for example, when the wavelengths of the incoherent beam used to illuminate the target and the HEL are similar. Alternatively, the second processor 885 may use the zero focus point for the target image as an estimate of the zero focus point for the HEL image and introduce a focus bias in the HEL image based on this zero focus point. This also eliminates the need to perform the first operation 950.

In a third operation 970, the second processor 880 performs a search for â that minimizes the error cost assuming that the image $I_0$ of the hit spot is known and equal to an Airy disk for a circular aperture. An Airy disk represents the best focus spot possible from a circular aperture with diffraction limitations.

After determining the aberration, the second processor 880 can adjust the deformable mirror 830 in a fourth operation 980 using a conjugate of the determine aberration to correct for the phase aberration in the HEL. The second processor 885 may also correct the phase aberration by adjusting a spatial light modulator or other mechanism.

To perform IWS and phase corrections for subsequent time frames, the second computer 880 may repeat the second, third and fourth operations. In one aspect, for a subsequent time frame, the first processor 880 may use the focus bias position from the previous time frame to initialize â.

When the HEL source 845 is first fired, the second processor 880 can use the aberration estimate from the IWS for the target image as an initial guess to correct for the HEL phase aberration. In this aspect, the second processor 880 can initially adjust the deformable mirror 830 to correct for the HEL phase aberration based on the aberration estimate from the IWS for the target image, which is performed by the first processor 865. In this aspect, the operations of the first and second processors may be performed by the same processor or a plurality of processors communicatively coupled to one another, such as, for example, parallel processors for increased computational speed.

Figure 14:
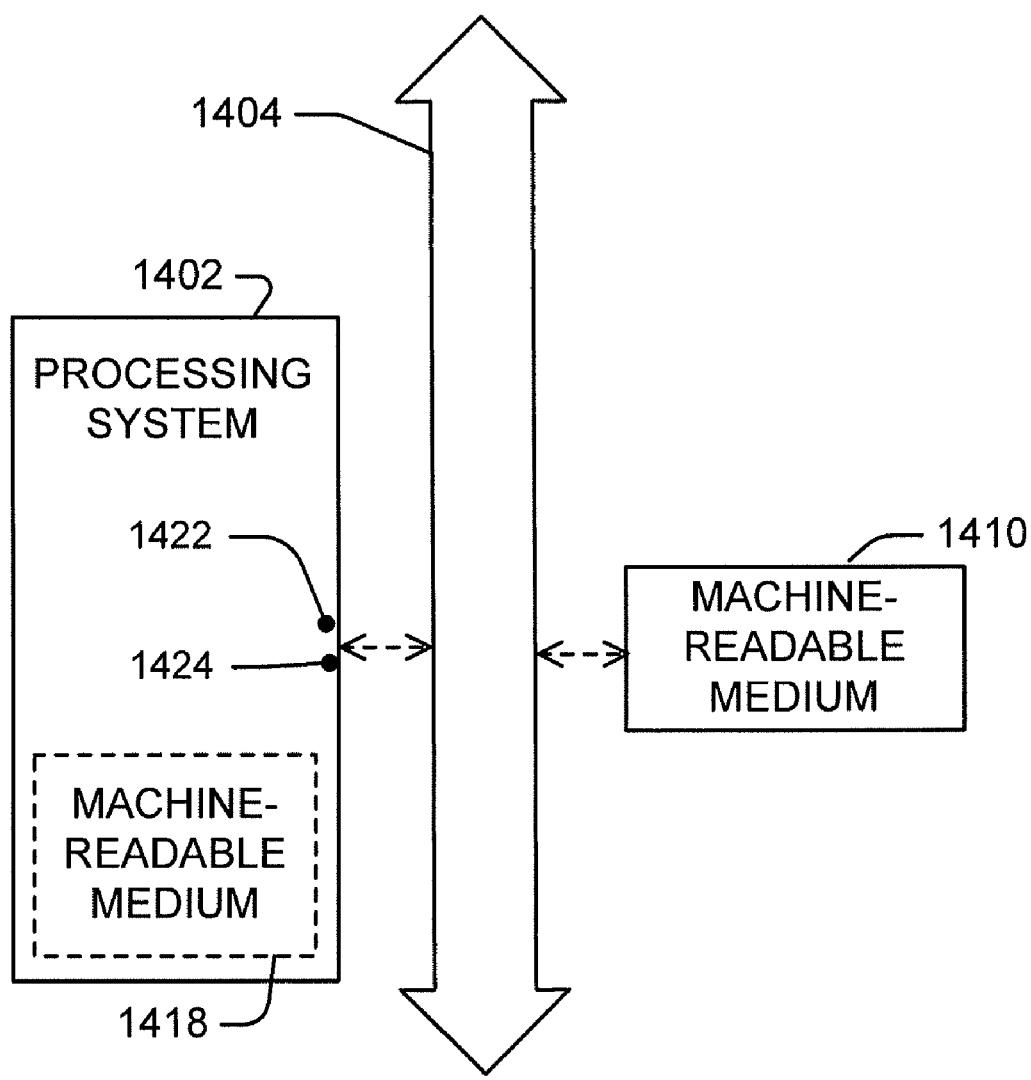
FIG. 14 shows a block diagram of a processing system according to an aspect of the present disclosure.

FIG. 14 is a block diagram of a processing system 1402 according to an aspect of the disclosure. The processing system 1402 may be used to perform the operations of the first and second processors 865 and 880 described above. The processing system 1402 may comprise one or a plurality of processors. For example, the processing system 1402 may comprise a plurality of parallel processors for performing computations in parallel to increase computational speed. The processing system 1402 may include a general-purpose processor or a specific-purpose processor for executing instructions and may further include volatile or non-volatile memory for storing data and instructions for software programs. The instructions, which may be stored in a machine-readable medium 1410 and/or 1418, may be executed by the processing system 1402 to perform the operations described above.

The processing system 1402 may communicate with the cameras 850 and 880, the actuators 860 and 877 and deformable mirror 830 via a bus 404 or other structures or devices.

Machine-readable media (e.g., 1418) may include storage integrated into a processor, such as might be the case with an ASIC. Machine-readable media (e.g., 1410) may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. According to one aspect of the disclosure, a machine-readable medium is a computer-readable medium encoded or stored with instructions that may be executed by the processing system 1402 to perform the operations described above.

Figure 10A:
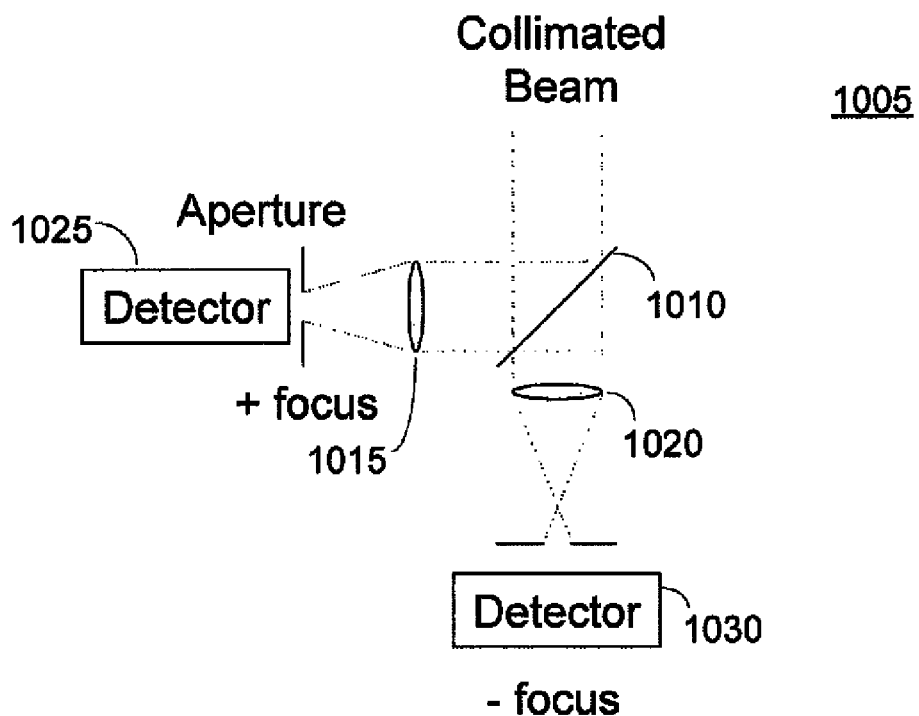
FIG. 10a is a block diagram of a focus error sign detector according to an aspect of the present disclosure.

FIG. 10a is a block diagram of a focus sign detector 1005 according to an aspect of the present disclosure. As discussed above, the sign of the focus error may be used to direct the initial line search in Eq. (6). The focus sign detector 1005 comprises a beam splitter 1010, first and second focus lenses 1015 and 1020, and first and second light detector 1025 and 1030. The first light detector 1025 is positioned at a positive focal plane of the first lens 1015 and the second light detector 1030 is positioned at a negative focal plane of the second lens 1020. The beam splitter 1010 splits a beam from the target to the first and second lenses 1015 and 1025. The first and second light detectors 1025 and 1030 measure light intensity at the positive and negative focal planes, respectively, and the sign of the difference between the two measured light intensities indicates the sign of the focus error.

Figure 10B:
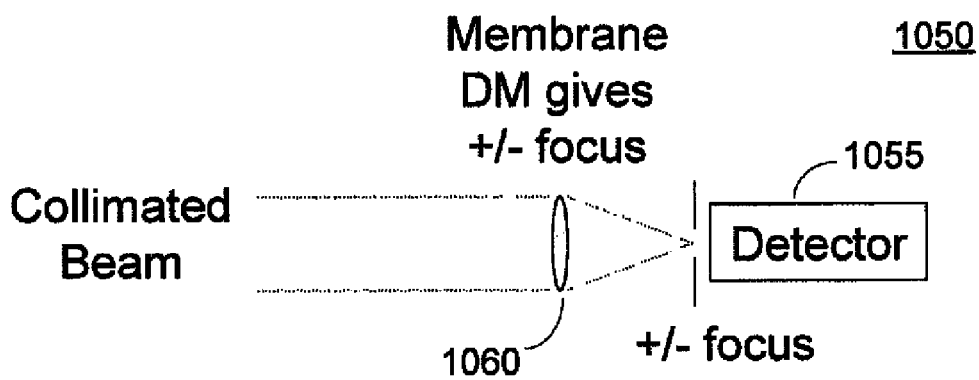
FIG. 10b is a block diagram of a focus error sign detector according to another aspect of the present disclosure.

FIG. 10b is a block diagram of a focus sign detector 1050 that only uses one light detector 1055 for determining the sign of the focus error according to an aspect of the present disclosure. The focus sign detector 1050 comprises the light detector 1055 and a deformable mirror 1060. The deformable mirror 1060 receives a beam from the target and alternately focuses the beam between positive focus and negative focus on the light detector 1055. The light detector 1055 measures light intensity at the positive and negative focuses, and the sign of the difference between the two measured light intensities indicates the sign of the focus error.

Figure 11A:
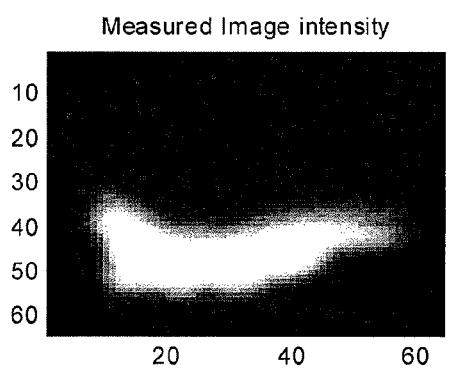
FIGS. 11a-11d show simulation results for incoherent image cleanup according to an aspect of the present disclosure.
Figure 11B:
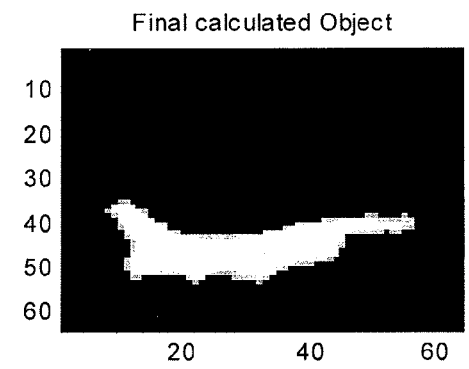
Figure 11C:
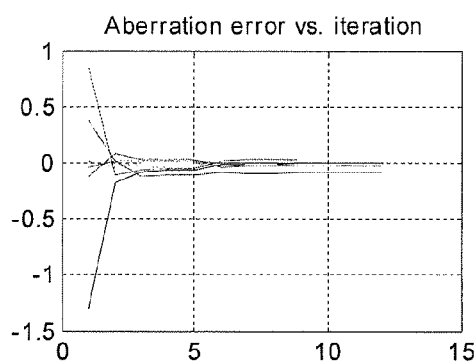
Figure 11D:
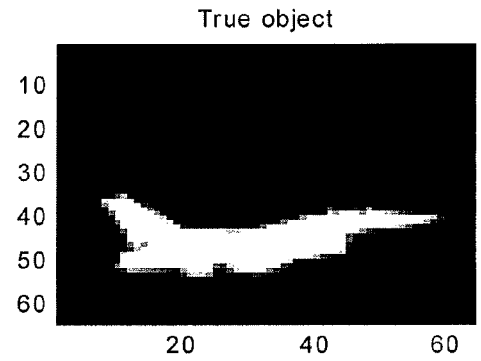
Figure 12A:
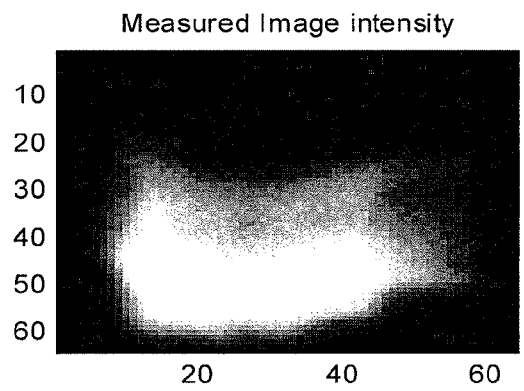
FIGS. 12a-12d show simulation results for incoherent image cleanup according to another aspect of the present disclosure.
Figure 12B:
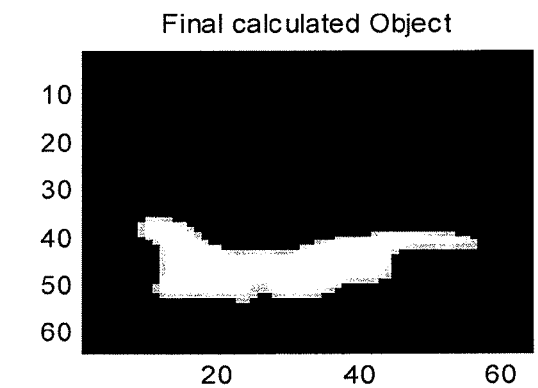
Figure 12C:
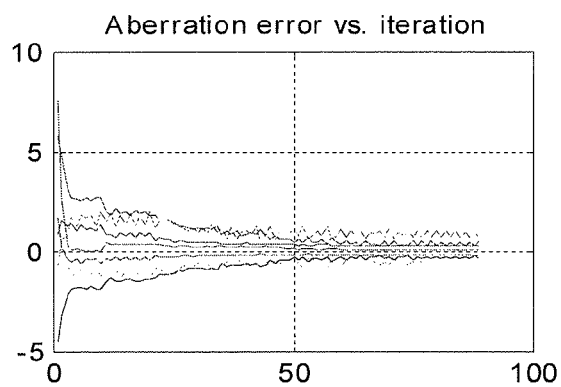
Figure 12D:

Incoherent image cleanup using the IWS has been simulated using the forward looking aero-optic aberrations generated using Computational Fluid Dynamic for a C130 aircraft. The magnitude of the wave front aberration is ¼ $\lambda$rms. The aero-optical aberration is decomposed into 21 Zernike modes but only 10 Zernike modes are used in the IWS simulation being that aberration modes above the $11^{th}$ Zernike contributed negligibly to the eave front error (WFE). Only the first 10 Zernike modes (i.e. focus, coma and astigmatism) are searched. Gaussian noise is added to the image with a standard deviation $\sigma = I_{max}/SNR$ where $I_{max}$ is the maximum intensity in the image and SNR is an input parameter. The image is on a 64×64 imaging array. FIGS. 11a to 11d show the performance of the WFE and image quality for SNR=10 for an input WFE of $\lambda/4$ rms with the higher order aberrations included. The residual WFE is $<\lambda/65$ rms for small input aberration expected from a forward looking C130 aircraft with a SNR=10. FIG. 11a shows the measured image intensity of the target, FIG. 11b shows the cleaned up image of the target, and FIG. 11d shows the true target image intensity. FIG. 11c is a plot of the aberration error versus iteration.

In FIGS. 12a to 12d, the simulation of FIGS. 11a to 11d are repeated but with the first 10 Zernike modes scaled up to 1 $\lambda$rms, while leaving the higher Zernike modes unchanged. The performance now degrades to $<\lambda/5$ rms when the input aberration is as large as 1 $\lambda$rms. The image quality after clean up is quite good, although this result suggests that a higher SNR is required for these larger initial wave front error (WFE).

Coherent image cleanup using the IWS with a known intensity $I_o$ has been simulated using the forward looking aero-optic aberrations discussed above. The desired intensity on target is an Airy disk profile. The image is on a 64×64 imaging array with 4 pixels across the Airy disc. As with the incoherent case, the first 10 Zernikes have been scaled to give a WFE of 1 λrms with the remaining (unsealed) higher order Zernikes included but contributing negligibly to the total WFE. Again, only the first 10 Zernike modes (i.e. focus, coma and astigmatism) are searched. FIGS. 13a to 13d show the performance of the WFE and image quality for SNR=10 for an input WFE of 1 λrms. The residual WFE is <λ/50 rms. FIG. 13a shows the true image intensity of the hit spot, FIG. 13b shows the measured image intensity of the hit spot, and FIG. 11d shows the image intensity after clean up. FIG. 13c is a plot of the aberration error versus iteration.

The speed of the algorithm depends on the object intensity profile as well as the aberration and noise level. The higher the noise and aberration, the longer it takes to converge. The small and large initial WFE calculations above took 3 and 12 sec to complete, respectively, and 500 μsec to complete a 64×64 FFT on a PC. Scaling to the fastest FPGA chip on the market (in 2007) which takes <1 μsec to complete a FFT, the camera frame rate required for the IWS is estimated to be from ~41-166 Hz for a 64×64 incoherent imaging application. The rational for the scaling is 3 sec×(1 μsec/500 μsec)=6 msec or 166 Hz frame rate. The frame rate is 10× faster or 410-1660 Hz for the cw HEL AO application. The 10× increase in speed for the cw HEL AO application is due to the desired intensity being known and thus not having to search for $I_o$ as discussed above.

The majority of the time is spent on calculating the gradient which is a matrix whose column is the image intensity with dimension of the image size and the row dimensions equal to the number of Zernike modes n. With a multi-processor implementation, the gradient can be calculated in parallel using n processors to calculate the n columns of the gradient, saving the processing time by n times. The above results are for 7 Zernike modes. This means that the actual speed with multi-processors can be 7× faster. This gives a camera frame rate of 287-1162 Hz and a closed loop bandwidth of 28-116 Hz for the incoherent imaging application. The estimated closed loop bandwidth for the cw HEL AO application is 280-1160 Hz.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the sprit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. An optical system, comprising:
    an imaging system configured to image a hit spot of a high energy laser (HEL) on a target;
    a phase compensator configured to apply a phase compensation to the HEL; and
    a processor configured to receive an image of the hit spot on the target from the imaging system, estimate a phase aberration based on the image of the hit spot, and adjust the phase compensator based on the estimated phase aberration to compensate for the phase aberration in the HEL.

2. The optical system of claim 1, wherein the processor is configured to apply a focus bias in the imaging system, receive the image of the hit spot with the focus bias, and estimate the phase aberration based on the image of the hit spot with the focus bias.

3. The optical system of claim 2, wherein the processor is configured to estimate the phase aberration by searching for an aberration that minimizes an error cost.

4. The optical system of claim 3, wherein the error cost comprises an error between the image of the hit spot and an image that is a function of the aberration in the searching and an estimate of the hit spot on the target.

5. The optical system of claim 4, wherein the estimate of the hit spot on the target is approximately an Airy disk.

6. The optical system of claim 3, wherein the processor is configured to initialize the aberration in the searching to an aberration corresponding to the focus bias.

7. The optical system of claim 2, wherein the imaging system comprises:
    a camera configured to image the hit spot on the target;
    a focus lens; and
    a lens actuator configured to move the focus lens,
    wherein the processor is configured to apply the focus bias in the imaging system by commanding the lens actuator to move the focus lens to a focus bias position.

8. The optical system of claim 1, wherein the phase compensator comprises a deformable minor.

9. An optical system, comprising:
    an imaging system configured to image a target; and
    a processor configured to receive an image of the target from the imaging system, estimate a wave front aberration based on the image of the target, and clean up the image of the target based on the estimated wave front aberration,
    wherein the processor is configured to apply a focus bias in the imaging system, receive the image of the target with the focus bias, and estimate the wave front aberration based on the image of the target with the focus bias.

10. The optical system of claim 9, wherein the processor is configured to estimate the wave front aberration by searching for an aberration that minimizes an error cost.

11. The optical system of claim 10, wherein the error cost comprises an error between the image of the target and an image that is a function of the aberration in the searching and an estimate of an image at the target.

12. The optical system of claim 10, wherein the processor is configured to initialize the aberration in the searching to an aberration corresponding to the focus bias.

13. The optical system of claim 11, wherein the processor is configured to search for the image at the target that minimizes the error cost.

14. The optical system of claim 13, wherein the processor is configured to conduct the search for the image at the target that minimizes the error cost in reduced spatial dimensions compared with spatial dimensions of the image of the target.

15. The optical system of claim 13, wherein the processor is configured to conduct the search for the image at the target that minimizes the error cost in binary intensity dimensions.

16. The optical system of claim 9, wherein the imaging system comprises:
   a camera configured to image the target;
   a focus lens; and
   a lens actuator configured to move the focus lens,
   wherein the processor is configured to apply the focus bias in the imaging system by commanding the lens actuator to move the focus lens to a focus bias position.

17. The optical system of claim 9, wherein the wave front aberration comprises two or more Zernike modes.

18. The optical system of claim 9, further comprising:
   a detector configured to detect a sign of a focus error,
   wherein the processor is configured to estimate the wave front aberration by searching for an aberration that minimizes an error cost, wherein the processor is configured to search in a direction corresponding to the sign of the focus error from the detector.

19. The optical system of claim 18, wherein the error cost comprises an error between the image of the target and an image that is a function of the aberration in the search and an estimate of an image at the target.

\* \* \* \* \*

UNITED STATES PATENT AND TRADEMARK OFFICE
CERTIFICATE OF CORRECTION

PATENT NO.        : 7,919,741 B1
APPLICATION NO.   : 12/338986
DATED             : April 5, 2011
INVENTOR(S)       : David Chiu et al.

It is certified that error appears in the above-identified patent and that said Letters Patent is hereby corrected as shown below:

Column 3, Line 56:   Replace "search for $\vec{a}$ and $\vec{I}$", with -- search for $\vec{a}$ and $\vec{I}_o$ --

Column 3, Line 63:   Replace "target intensity $I_n$", with -- target intensity $I_o$ --

Column 6, Line 48:   Replace "whether $a$", with --whether $\hat{a}$ --

Column 6, Line 65:   Replace "searches for $a$" with -- searches for $\hat{a}$ --

Column 7, Line 3:    Replace "intensity $I_n$", with -- intensity $I_m$ --

Column 7, Line 15:   Replace "searches for $a$" with -- searches for $\hat{a}$ --

Column 14, Line 43:  Replace "minor", with -- mirror --

Signed and Sealed this
Twenty-fifth Day of October, 2011

David J. Kappos
*Director of the United States Patent and Trademark Office*